(12) United States Patent
Tang

(10) Patent No.: US 11,782,539 B2
(45) Date of Patent: Oct. 10, 2023

(54) DISPLAY PANEL AND DISPLAY DEVICE

(71) Applicant: WUHAN CHINA STAR OPTOELECTRONICS TECHNOLOGY CO., LTD., Hubei (CN)

(72) Inventor: Wei Tang, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 607 days.

(21) Appl. No.: 16/963,006

(22) PCT Filed: Jun. 17, 2020

(86) PCT No.: PCT/CN2020/096643
§ 371 (c)(1),
(2) Date: Jul. 17, 2020

(87) PCT Pub. No.: WO2021/223290
PCT Pub. Date: Nov. 11, 2021

(65) Prior Publication Data
US 2023/0113932 A1      Apr. 13, 2023

(30) Foreign Application Priority Data

May 6, 2020 (CN) .......................... 202010370858.2

(51) Int. Cl.
*G06F 3/041*     (2006.01)
*G02F 1/1333*    (2006.01)
*G02F 1/1343*    (2006.01)

(52) U.S. Cl.
CPC ........ *G06F 3/0412* (2013.01); *G02F 1/13338* (2013.01); *G02F 1/134309* (2013.01)

(58) Field of Classification Search
CPC ................... G06F 3/041–047; G02F 1/13338
See application file for complete search history.

(56) References Cited

U.S. PATENT DOCUMENTS

2016/0364069 A1* 12/2016 Tsai ................... G06F 3/0412
2018/0031931 A1*  2/2018 Qin ................. G02F 1/136213

FOREIGN PATENT DOCUMENTS

| CN | 104808883 A | 7/2015 |
| CN | 205899516 U | 1/2017 |
| CN | 106959784 A | 7/2017 |
| CN | 106990869 A | 7/2017 |
| CN | 206497442 U | 9/2017 |

(Continued)

*Primary Examiner* — Sanjiv D. Patel
(74) *Attorney, Agent, or Firm* — PV IP PC; Wei Te Chung; Zhigang Ma

(57) ABSTRACT

The present application discloses a display panel and a display device. The display panel includes: a common electrode layer including a plurality of columns of first common electrodes, wherein each column of the plurality of columns of the first common electrodes includes a plurality of touch electrodes insulated from each other; and a driving module. Each of the plurality of touch electrodes is electrically connected to the driving module through one or more touch leads. A number of the touch leads corresponding to each of or adjacent ones of the plurality of touch electrodes gradually increases along a direction away from the driving module.

12 Claims, 1 Drawing Sheet

(56) References Cited

FOREIGN PATENT DOCUMENTS

| | | | |
|---|---|---|---|
| CN | 206649492 U | * | 11/2017 |
| CN | 206649492 U | | 11/2017 |
| CN | 108376687 A | | 8/2018 |
| CN | 110262689 A | | 9/2019 |
| KR | 20170133728 A | | 12/2017 |
| WO | 2018205660 A1 | | 11/2018 |

* cited by examiner

DISPLAY PANEL AND DISPLAY DEVICE

FIELD OF INVENTION

The present application is related to the field of display technology, and specifically, to a display panel and a display device including the display panel.

BACKGROUND OF INVENTION

With rapid development of display technology, display device types have become more and more diverse, and display panels have been widely used in various fields in people's lives, especially touch panels. The touch panels have already covered all aspects of people's lives.

Currently, a screen refresh rate of display devices is 60 Hz, and the screen refresh rate of 60 Hz is usually sufficient for daily use. However, a screen refresh rate of 120 Hz allows the display devices to display a smoother picture texture, so more and more display devices are beginning to demand 120 Hz refresh rate. In response to an increase in the screen refresh rate, requirements for a touch function of the display device also increases. In current display devices, due to influence of touch lead impedance, it is easy for touch electrodes in the display devices to be undercharged.

SUMMARY OF INVENTION

The present application provides a display panel and a display device, which can solve technical problems in the prior art that touch electrodes are undercharged due to influence of touch lead impedance, thereby affecting improvement of a touch function of a display device.

In order to solve the above problems, an embodiment of the present application provides a display panel. The display panel includes a display region and a non-display region. The display panel further includes:

a common electrode layer disposed in the display region and including a plurality of columns of first common electrodes, wherein each column of the plurality of columns of the first common electrodes includes a plurality of touch electrodes insulated from each other; and a driving module disposed in the non-display region. Each of the plurality of touch electrodes is electrically connected to the driving module through one or more touch leads. A number of the touch leads corresponding to each of or adjacent ones of the plurality of touch electrodes gradually increases along a direction away from the driving module.

In an embodiment of the present application, the touch leads corresponding to each of the plurality of touch electrodes extend in a direction close to the driving module and are merged and connected to the driving module.

In an embodiment of the present application, each column of the plurality of columns of the first common electrodes includes a first electrode group, a second electrode group, and a third electrode group, which are sequentially arranged along the direction away from the driving module. Each of the first electrode group, the second electrode group, and the third electrode group independently includes one or more of the plurality of touch electrodes.

In an embodiment of the present application, a number of the touch leads corresponding to each of the plurality of touch electrodes in the first electrode group is equal to a first value. A number of the touch leads corresponding to each of the plurality of touch electrodes in the second electrode group is equal to a second value. A number of the touch leads corresponding to each of the plurality of touch electrodes in the third electrode group is equal to a third value. The first value is less than the second value, and the second value is less than the third value.

In an embodiment of the present application, the display panel further includes:

a first insulating layer disposed under the common electrode layer and covering the touch leads. The first insulating layer is provided with a plurality of first through holes. The plurality of touch electrodes are electrically connected to the touch leads through the corresponding plurality of first through holes. A number of the plurality of first through holes corresponding to each of or adjacent ones of the plurality of touch electrodes gradually increases along the direction away from the driving module.

In an embodiment of the present application, in an overlapping region between the plurality of touch electrodes and the corresponding touch leads. The plurality of first through holes are evenly distributed on each of the plurality of touch electrodes.

In an embodiment of the present application, the display panel further includes:

a substrate;

a transistor array layer disposed on the substrate and including a transistor component corresponding to the display region and a spacer layer covering the transistor component; and a first metal layer disposed on the transistor array layer and including the touch leads, wherein the first insulating layer is disposed between the first metal layer and the common electrode layer.

In an embodiment of the present application, the display panel further includes: a passivation layer covering the common electrode layer; and a pixel electrode disposed on the passivation layer. The pixel electrode is electrically connected to the common electrode layer and the transistor component through a second through hole. The second through hole passes through the passivation layer, the first insulating layer, and a portion of the spacer layer.

In an embodiment of the present application, the common electrode layer includes second common electrodes insulated from the plurality of columns of the first common electrodes. The pixel electrode is electrically connected to the second common electrodes through the second through hole.

The present application provides a display device according to the above purposes. The display device includes a display panel. the display panel includes a display region and a non-display region. The display panel further includes:

a common electrode layer disposed in the display region and including a plurality of columns of first common electrodes, wherein each column of the plurality of columns of the first common electrodes includes a plurality of touch electrodes insulated from each other; and a driving module disposed in the non-display region. Each of the plurality of touch electrodes is electrically connected to the driving module through one or more touch leads. A number of the touch leads corresponding to each of or adjacent ones of the plurality of touch electrodes gradually increases along a direction away from the driving module.

In an embodiment of the present application, the touch leads corresponding to each of the plurality of touch electrodes extend in a direction close to the driving module and are merged and connected to the driving module.

In an embodiment of the present application, each column of the plurality of columns of the first common electrodes includes a first electrode group, a second electrode group, and a third electrode group, which are sequentially arranged along the direction away from the driving module. Each of the first electrode group, the second electrode group, and the third electrode group independently includes one or more of the plurality of touch electrodes.

In an embodiment of the present application, a number of the touch leads corresponding to each of the plurality of touch electrodes in the first electrode group is equal to a first value. A number of the touch leads corresponding to each of the plurality of touch electrodes in the second electrode group is equal to a second value. A number of the touch leads corresponding to each of the plurality of touch electrodes in the third electrode group is equal to a third value. The first value is less than the second value, and the second value is less than the third value.

In an embodiment of the present application, the display panel further includes:

a first insulating layer disposed under the common electrode layer and covering the touch leads. The first insulating layer is provided with a plurality of first through holes. The plurality of touch electrodes are electrically connected to the touch leads through the corresponding plurality of first through holes. A number of the plurality of first through holes corresponding to each of or adjacent ones of the plurality of touch electrodes gradually increases along the direction away from the driving module.

In an embodiment of the present application, in an overlapping region between the plurality of touch electrodes and the corresponding touch leads, the plurality of first through holes are evenly distributed on each of the plurality of touch electrodes.

In an embodiment of the present application, the display panel further includes:

a substrate;

a transistor array layer disposed on the substrate and including a transistor component corresponding to the display region and a spacer layer covering the transistor component; and a first metal layer disposed on the transistor array layer and including the touch leads, wherein the first insulating layer is disposed between the first metal layer and the common electrode layer.

In an embodiment of the present application, the display panel further includes: a passivation layer covering the common electrode layer; and a pixel electrode disposed on the passivation layer. The pixel electrode is electrically connected to the common electrode layer and the transistor component through a second through hole. The second through hole passes through the passivation layer, the first insulating layer, and a portion of the spacer layer.

In an embodiment of the present application, the common electrode layer includes second common electrodes insulated from the plurality of columns of the first common electrodes. The pixel electrode is electrically connected to the second common electrodes through the second through hole.

Compared with the prior art, the present application configures different numbers of the touch leads corresponding to a distance from each of the plurality of touch electrodes to the driving module to increase the number of the touch leads corresponding to each of the plurality of touch electrodes away from the driving module, so as to increase channels of electric current and reduce impedance. In this way, charging of the plurality of touch electrodes away from the driving module is not affected by a distance, thereby improving a touch function of the display panel and satisfies a display requirement of a higher refresh rate.

DESCRIPTION OF DRAWINGS

The following describes specific embodiments of the present application in detail with reference to the accompanying drawings, which will make technical solutions and other beneficial effects of the present application obvious.

DETAILED DESCRIPTION OF PREFERRED EMBODIMENTS

Figure 1:
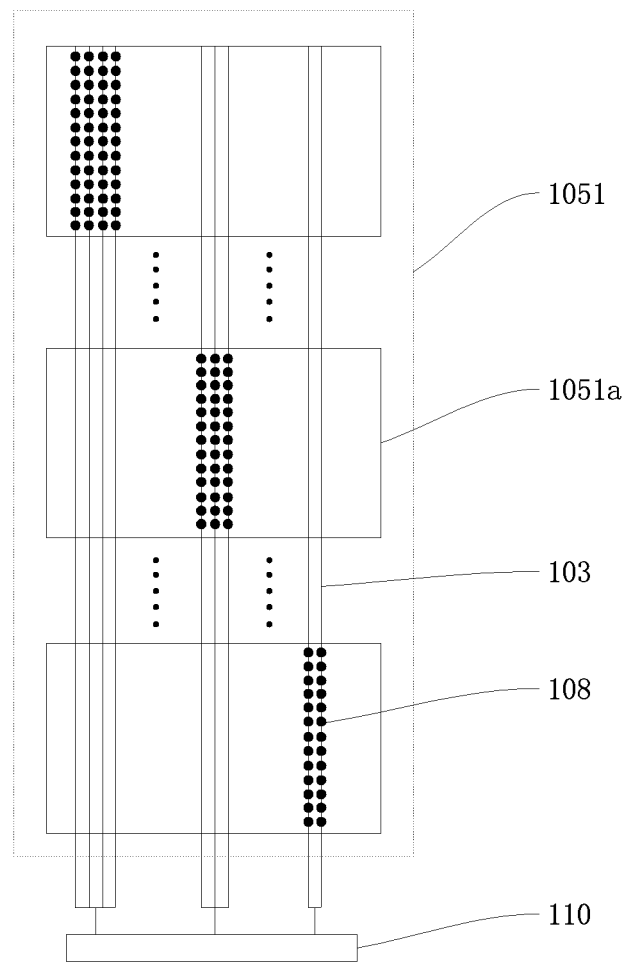
FIG. 1 is a schematic diagram of an arrangement structure of touch electrodes and touch leads provided by an embodiment of the present application.

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the of the present application.

In the description of the present application, it should be explained that the terms "center", "portrait", "transverse", "length", "width", "thickness", "upper", "lower", "front", "back", "left", "right", "vertical", "horizontal", "top", "bottom", "inside", "outside", etc. are based on the drawings. The orientation or positional relationship is only for the convenience of describing the present application and simplifying the description, and does not indicate or imply that the device or element referred to must have a specific orientation, structure and operation in a specific orientation, and should not be viewed as limitations of the present application. In addition, terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "multiple" is two or more, unless specifically defined otherwise.

In the description of the present application, it should be explained that terms "installation", "link", and "connection" should be understood broadly, unless explicitly stated and limited otherwise. For example, connection can be fixed connection or removable or integral connection, can be mechanical connection, electrical connection or mutual communication, can be direct connection or indirect connection through an intermedium, or can be the internal communication between two components or the mutual reaction between two components. For a skilled person in the art, the specific meanings of the above terms of the present application can be understood according to practical situations.

In the present application, unless explicitly stated and limited, the first feature is "on" or "under" the second feature may refer to that the first feature and second feature are directly contact, or are indirectly through another feature between them. Moreover, the first feature is "above", "upon", and "upper" the second feature, including that the first feature is directly above and obliquely above the second feature refers to that t the first feature is higher in level than the second feature. The first feature is "below", "down", and "under" of the second feature refers to that the first feature is directly below or obliquely below the second feature, or merely refers to that the first feature is horizontally lower than the second feature.

The following application provides many different embodiments or examples for implementing different structures of the present application. To simplify the application of the present application, the components and settings of specific examples are described below. Obviously, these are merely examples instead of limitation of the present application. Furthermore, the present application may repeat reference numbers and/or reference letters in different examples, and such repetition is for the purpose of simplicity and clarity, and does not indicate the relationship between the various embodiments and/or settings. Moreover, the present application provides examples of various specific processes and materials, but the applicability of other processes and/or application of other materials may be appreciated by a person skilled in the art.

The present application is aimed at current display panels. Due to influence of touch lead impedance, a touch electrode is undercharged, which causes a technical problem of affecting improvement of a touch function of a display device.

Figure 2:
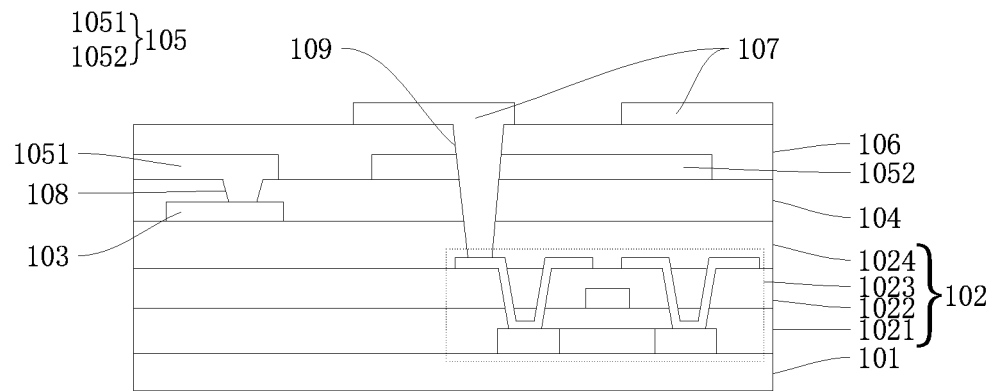
FIG. 2 is a schematic structural diagram of a display panel provided by an embodiment of the present application.

In order to solve the above technical problem, an embodiment of the present application provides a display panel as shown in FIGS. 1 and 2. The display panel includes a display region and a non-display region, the display panel further includes: a common electrode layer 105 disposed in the display region and including a plurality of columns of first common electrodes 1051, wherein each column of the plurality of columns of the first common electrodes 1051 includes a plurality of touch electrodes 1051*a* insulated from each other; and a driving module 110 disposed in the non-display region. Each of the plurality of touch electrodes 1051*a* is electrically connected to the driving module 110 through one or more touch leads 103. A number of the touch leads 103 corresponding to each of or adjacent ones of the plurality of touch electrodes 1051*a* gradually increases along a direction away from the driving module 110.

In the implementation and application processes of a current display panel, the touch electrodes are connected to the driving module through the touch leads, so the touch leads corresponding to the touch electrodes away from the driving module are longer, thereby increasing impedance. Due to an increase in refresh rate, the touch electrodes away from the driving module are undercharged or untimely, which affects the touch function and causes an uneven display. In the display panel provided by an embodiment of the present application, the number of the touch leads increases along the direction away from the driving module, which increases channels of electric current between the driving module and the touch electrodes and reduces impedance. The display panel is prevented from damaging the touch function and the uneven display due to an impedance factor of the touch leads.

Specifically, please continue to refer to FIGS. 1 and 2, the display panel includes a substrate 101, a transistor array layer 102 disposed on the substrate 101, a first metal layer disposed on the transistor array layer 102, a first insulating layer 104 covering the first metal layer, the common electrode layer 105 disposed on the first insulating layer 104, a passivation layer 106 covering the common electrode layer 105, and a pixel electrode 107 disposed on the passivation layer 106. It should be explained that drawings provided by embodiments of the present application only show a partial structure of the display panel, and a subsequent counter substrate and a liquid crystal layer can be configured by referring to a conventional manufacturing process, which is not repeated herein.

The transistor array layer 102 includes a transistor component 1023 corresponding to the display region and a spacer layer covering the transistor component 1023. The spacer layer includes a second insulating layer 1021, a gate insulating layer 1022, and an interlayer insulating layer 1024, which are sequentially disposed on the substrate 101. The transistor component 1023 includes an active layer disposed on the substrate 101, a gate disposed on the second insulating layer 1021, and a source and a drain disposed on the gate insulating layer 1022. The source and the drain are respectively connected to two sides of the active layer through a through hole.

The first metal layer is disposed on the interlayer insulating layer 1024. The first metal layer includes the touch leads 103. The first insulating layer 104 is disposed on the interlayer insulating layer 1024 and covers the touch leads 103.

The common electrode layer 105 is disposed on the first insulating layer 104. The common electrode layer 105 includes a plurality of columns of first common electrodes 1051 and second common electrodes 1052 insulated from the first common electrodes 1051.

An embodiment of the present application takes one column of the plurality of columns of first common electrodes 1051 as an example to illustrate. Each column of the plurality of columns of the first common electrodes 1051 includes the plurality of touch electrodes 1051*a* insulated from each other. The first insulating layer 104 is provided with a plurality of first through holes 108. The plurality of touch electrodes 1051*a* are electrically connected to the touch leads 103 through the corresponding plurality of first through holes 108. The number of the plurality of first through holes 108 corresponding to each of or adjacent ones of the plurality of touch electrodes 1051*a* gradually increases along the direction away from the driving module 110. In addition, in an overlapping region between the plurality of touch electrodes 1051*a* and the corresponding touch leads 103, the plurality of first through holes 108 are evenly distributed on each of the plurality of touch electrodes 1051*a*.

Each of the plurality of touch electrodes 1051*a* is electrically connected to the driving module 110 through one or more touch leads 103. The number of the touch leads 103 corresponding to each of or adjacent ones of the plurality of touch electrodes 1051*a* gradually increases along the direction away from the driving module 110.

Specifically, each of the touch electrodes 1051*a* is electrically connected to the touch lead 103 through the first through hole 108. An end of the touch lead 103 is electrically connected to the corresponding touch electrode 1051*a*, and another end of the touch lead 103 is electrically connected to the driving module 110, so that the touch electrode 1051*a* is electrically connected to the driving module 110 through the corresponding touch leads 103 to realize an input of signals and the touch function of the display panel.

In an embodiment of the present application, the number of the touch leads 103 corresponding to each of or adjacent ones of the plurality of touch electrodes 103 gradually increases along the direction away from the driving module 110. That is, the farther the touch electrodes 1051*a* are away from the driving module 110, the greater the number of the corresponding touch leads 103 are. As shown in FIG. 1, the number of the touch leads 103 corresponding to the touch electrodes 1051a away from the driving module 110 is increased to increase the channels of the electric current, which can achieve a purpose of reducing impedance and prevent undercharging of the touch electrodes 1051a and an uneven display of the display panel due to the increase in refresh rate.

Furthermore, the touch electrodes 1051a are electrically connected to the touch leads 103 through the first through holes 108, and a number of the first through holes 108 also increases in the direction away from the driving module 110, which means that the number of the first through holes 108 increases in the direction away from the driving module 110.

In an embodiment of the present application, the number of the first through holes 108 corresponding to each of the touch leads 103 is equal, and each of the touch leads 103 corresponding to the first through holes 108 can be evenly distributed in the overlapping region between the touch leads 103 and the corresponding touch electrodes 1051a. In addition, the first through holes 108 can be distributed at all positions of the overlapping region to maximize a contact area and improve a signal transmission capability. The number of the first through holes 108 corresponding to each of the touch leads 103 is equal, which ensures same contact areas of each of the touch leads 103 and improves a uniformity of signal transmission and a uniformity of display.

The touch leads 103 corresponding to each of the touch electrodes 1051a extend in a direction close to the driving module 110 and are merged and connected to the driving module 110, that is, the driving module 110 first transmits signals of the corresponding touch electrode 1051a through a signal line, and then the signal line is divided into one or more touch leads 103 with different numbers according to different distances between the driving module 110 and the touch electrodes 1051a. The number of the touch leads 103 connected to each of the touch electrodes 1051a is positively related to the distance between each touch electrode 1051a and the driving module 110. In this way, the channels of the electric current corresponding to the touch electrodes 1051a away from the driving module 110 are increased, which reduces impedance, thereby preventing causing the undercharging and the uneven display due to an increase in impedance of the touch leads 103 with an increase in the distance.

In an embodiment of the present application, each column of the plurality of columns of the first common electrodes 1051 includes a first electrode group, a second electrode group, and a third electrode group, which are sequentially arranged along the direction away from the driving module 110. Each of the first electrode group, the second electrode group, and the third electrode group independently includes one or more of the plurality of touch electrodes 1051a.

A number of the touch leads 103 corresponding to each of the plurality of touch electrodes 1051a in the first electrode group is equal to a first value. A number of the touch leads 103 corresponding to each of the plurality of touch electrodes 1051a in the second electrode group is equal to a second value. A number of the touch leads 103 corresponding to each of the plurality of touch electrodes 1051a in the third electrode group is equal to a third value.

Specifically, as shown in FIG. 1, the first value can be equal to two, the second value can be equal to three, and the third value can be equal to four, but they are not limited thereto. According to an increase in the refresh rate of the display panel, the number of the touch leads 103 corresponding to the touch electrodes 1051a can also be increased correspondingly to satisfy functional requirements of the display panel.

It should be explained that distribution of the first common electrode 1051 for each column is not limited to three groups, and can also be divided into four groups, five groups, and six groups according to actual conditions, which is not limited herein. Similarly, the number of the touch electrodes 1051a in each electrode group can also be determined according to changes in a resistance of the touch leads 103.

In addition, as shown in FIG. 2, the pixel electrode 107 is electrically connected to the common electrode layer 105 and the transistor component 1023 through a second through hole 109. The second through hole 109 passes through the passivation layer 106, the first insulating layer 104, and a portion of the spacer layer. Specifically, the pixel electrode 107 is electrically connected to the second common electrode 1052 and the source through the second through hole 109 to realize a normal display function of the display panel.

In summary, embodiments of the present application increase the number of the touch leads corresponding to each of the plurality of touch electrodes away from the driving module, so as to increase the channels of the electric current and reduce impedance. In this way, charging of the plurality of touch electrodes away from the driving module is not affected by distance, thereby improving the touch function of the display panel and satisfying a display requirement of a higher refresh rate.

In addition, an embodiment of the present application further provides a display device. The display device includes the display panel in the above embodiments. Due to an arrangement design of the touch leads of the display panel, the display device can satisfy the display requirement and a touch requirement of the higher refresh rate, thereby improving the display effect and quality of the display device.

In the above embodiments, the descriptions of the various embodiments are different in emphases, for contents not described in detail, please refer to related description of other embodiments.

The display panel and the display device provided by embodiments of the present application are described in detail above, and the description of embodiments above is only for helping to understand technical solutions of the present application and its core idea. Understandably, for a person of ordinary skill in the art can make various modifications of the technical solutions of the embodiments of the present application above. However, it does not depart from the scope of the technical solutions of the embodiments of the present application.

What is claimed is:

1. A display panel, comprising:
   a display region;
   a non-display region;
   a common electrode layer disposed in the display region and comprising a plurality of columns of first common electrodes, wherein each column of the plurality of columns of the first common electrodes comprises a plurality of touch electrodes insulated from each other; and
   a driving module disposed in the non-display region;
   wherein each of the plurality of touch electrodes is electrically connected to the driving module through one or more touch leads, and a number of the touch leads corresponding to each of or adjacent ones of the plurality of touch electrodes gradually increases along a direction away from the driving module;
the display panel further comprises:
a substrate;
a transistor array layer disposed on the substrate and comprising a transistor component corresponding to the display region and a spacer layer covering the transistor component;
a first metal layer disposed on the transistor array layer and comprising the touch leads;
a first insulating layer disposed under the common electrode layer and covering the touch leads; wherein the first insulating layer is disposed between the first metal layer and the common electrode layer;
a passivation layer covering the common electrode layer; and
a pixel electrode disposed on the passivation layer;
wherein the first insulating layer is provided with a plurality of first through holes, the plurality of touch electrodes are electrically connected to the touch leads through the corresponding plurality of first through holes;
wherein the common electrode layer further comprises second common electrodes; the second common electrodes are insulated from the plurality of columns of the first common electrodes; a second through hole is provided passing through the passivation layer, a corresponding one of the second common electrodes, the first insulating layer, and a portion of the spacer layer; and the pixel electrode is electrically connected to the corresponding second common electrode through the second through hole.

2. The display panel according to claim 1, wherein the touch leads corresponding to each of the plurality of touch electrodes extend in a direction close to the driving module and are merged and connected to the driving module.

3. The display panel according to claim 1, wherein each column of the plurality of columns of the first common electrodes comprises a first electrode group, a second electrode group, and a third electrode group, which are sequentially arranged along the direction away from the driving module; and
each of the first electrode group, the second electrode group, and the third electrode group independently comprises one or more of the plurality of touch electrodes.

4. The display panel according to claim 3, wherein a number of the touch leads corresponding to each of the plurality of touch electrodes in the first electrode group is equal to a first value;
a number of the touch leads corresponding to each of the plurality of touch electrodes in the second electrode group is equal to a second value;
a number of the touch leads corresponding to each of the plurality of touch electrodes in the third electrode group is equal to a third value; and
the first value is less than the second value, and the second value is less than the third value.

5. The display panel according to claim 1,
wherein a number of the plurality of first through holes corresponding to each of or adjacent ones of the plurality of touch electrodes gradually increases along the direction away from the driving module.

6. The display panel according to claim 5, wherein in an overlapping region between the plurality of touch electrodes and the corresponding touch leads, the plurality of first through holes are evenly distributed on each of the plurality of touch electrodes.

7. A display device, comprising a display panel, wherein the display panel comprises:
a display region;
a non-display region;
a common electrode layer disposed in the display region and comprising a plurality of columns of first common electrodes, wherein each column of the plurality of columns of the first common electrodes comprises a plurality of touch electrodes insulated from each other; and
a driving module disposed in the non-display region;
wherein each of the plurality of touch electrodes is electrically connected to the driving module through one or more touch leads, and a number of the touch leads corresponding to each of or adjacent ones of the plurality of touch electrodes gradually increases along a direction away from the driving module;
the display panel further comprises:
a substrate;
a transistor array layer disposed on the substrate and comprising a transistor component corresponding to the display region and a spacer layer covering the transistor component;
a first metal layer disposed on the transistor array layer and comprising the touch leads;
a first insulating layer disposed under the common electrode layer and covering the touch leads; wherein the first insulating layer is disposed between the first metal layer and the common electrode layer;
a passivation layer covering the common electrode layer; and
a pixel electrode disposed on the passivation layer;
wherein the first insulating layer is provided with a plurality of first through holes, the plurality of touch electrodes are electrically connected to the touch leads through the corresponding plurality of first through holes;
wherein the common electrode layer comprises second common electrodes; the second common electrodes are insulated from the plurality of columns of the first common electrodes; a second through hole is provided passing through the passivation layer, a corresponding one of the second common electrodes, the first insulating layer, and a portion of the spacer layer; and the pixel electrode is electrically connected to the second common electrodes through the second through hole.

8. The display device according to claim 7, wherein the touch leads corresponding to each of the plurality of touch electrodes extend in a direction close to the driving module and are merged and connected to the driving module.

9. The display device according to claim 7, wherein each column of the plurality of columns of the first common electrodes comprises a first electrode group, a second electrode group, and a third electrode group, which are sequentially arranged along the direction away from the driving module; and
each of the first electrode group, the second electrode group, and the third electrode group independently comprises one or more of the plurality of touch electrodes.

10. The display device according to claim 9, wherein a number of the touch leads corresponding to each of the plurality of touch electrodes in the first electrode group is equal to a first value;

a number of the touch leads corresponding to each of the plurality of touch electrodes in the second electrode group is equal to a second value;

a number of the touch leads corresponding to each of the plurality of touch electrodes in the third electrode group is equal to a third value; and the first value is less than the second value, and the second value is less than the third value.

11. The display device according to claim 7, a number of the plurality of first through holes corresponding to each of or adjacent ones of the plurality of touch electrodes gradually increases along the direction away from the driving module.

12. The display device according to claim 11, wherein in an overlapping region between the plurality of touch electrodes and the corresponding touch leads, the plurality of first through holes are evenly distributed on each of the plurality of touch electrodes.

* * * * *